United States Patent
Mills et al.

(10) Patent No.: US 11,157,176 B2
(45) Date of Patent: *Oct. 26, 2021

(54) ON DEMAND MEMORY PAGE SIZE

(71) Applicant: Micron Technology, Inc., Boise, ID (US)

(72) Inventors: Duane R. Mills, Shingle Springs, CA (US); Richard E. Fackenthal, Carmichael, CA (US)

(73) Assignee: Micron Technology, Inc., Boise, ID (US)

(*) Notice: Subject to any disclaimer, the term of this patent is extended or adjusted under 35 U.S.C. 154(b) by 6 days.

This patent is subject to a terminal disclaimer.

(21) Appl. No.: 16/419,858

(22) Filed: May 22, 2019

(65) Prior Publication Data

US 2019/0339866 A1 Nov. 7, 2019

Related U.S. Application Data

(63) Continuation of application No. 15/684,792, filed on Aug. 23, 2017, now Pat. No. 10,394,456.

(51) Int. Cl.
*G06F 3/06* (2006.01)
*G06F 12/02* (2006.01)
(Continued)

(52) U.S. Cl.
CPC ............ *G06F 3/061* (2013.01); *G06F 3/0659* (2013.01); *G06F 3/0689* (2013.01); *G06F 9/00* (2013.01);
(Continued)

(58) Field of Classification Search
CPC ...... G06F 3/061; G06F 3/0689; G06F 3/0659; G06F 13/4282; G06F 3/06
(Continued)

(56) References Cited

U.S. PATENT DOCUMENTS 5,930,829 A 7/1999 Little
6,154,823 A * 11/2000 Benayon ............... G06F 12/023
711/170
(Continued)

FOREIGN PATENT DOCUMENTS

CN 101681298 A 3/2010
CN 101727976 A 6/2010
(Continued)

OTHER PUBLICATIONS

Yanan Cao, Long Chen and Zhao Zhang, "Flexible memory: A novel main memory architecture with block-level memory compression," 2015 IEEE International Conference on Networking, Architecture and Storage (NAS), 2015, pp. 285-294.*

(Continued)

*Primary Examiner* — Pierre Miche Bataille
(74) *Attorney, Agent, or Firm* — Holland & Hart LLP

(57) ABSTRACT

Systems, devices, and methods related to on demand memory page size are described. A memory system may employ a protocol that supports on demand variable memory page sizes. A memory system may include one or more non-volatile memory devices that may each include a local memory controller configured to support variable memory page size operation. The memory system may include a system memory controller that interfaces between the non-volatile memory devices and a processor. The system memory controller may, for instance, use a protocol that facilitates on demand memory page size where a determination of a particular page size to use in an operation may be based on characteristics of memory commands and data involved in the memory command.

20 Claims, 6 Drawing Sheets

(51) Int. Cl.
- *G06F 13/00* (2006.01)
- *G06F 9/00* (2006.01)
- *G06F 13/16* (2006.01)
- *G06F 1/3234* (2019.01)
- *G06F 13/42* (2006.01)

(52) U.S. Cl.
CPC .............. *G06F 12/02* (2013.01); *G06F 13/00* (2013.01); *G06F 13/16* (2013.01); *G06F 13/1668* (2013.01); *G06F 1/3275* (2013.01); *G06F 13/4282* (2013.01)

(58) Field of Classification Search
USPC .................................................. 711/170, 172
See application file for complete search history.

(56) References Cited

U.S. PATENT DOCUMENTS

| | | | |
|---|---|---|---|
| 7,400,549 | B2 | 7/2008 | Han et al. |
| 8,108,648 | B2* | 1/2012 | Srinivasan .......... G06F 12/0607 711/170 |
| 9,235,546 | B2 | 1/2016 | Pekny et al. |
| 9,432,298 | B1 | 8/2016 | Smith |
| 9,582,424 | B2* | 2/2017 | Gschwind ........... G06F 12/0862 |
| 9,600,410 | B1 | 3/2017 | Nazarian et al. |
| 2006/0271748 | A1 | 11/2006 | Jain et al. |
| 2007/0067520 | A1 | 3/2007 | Maddali et al. |
| 2007/0268765 | A1 | 11/2007 | Woo et al. |
| 2007/0280027 | A1 | 12/2007 | Skidmore |
| 2008/0010416 | A1* | 1/2008 | Beeston ................ G06F 3/0659 711/137 |
| 2009/0157983 | A1 | 6/2009 | Bowyer |
| 2009/0196103 | A1 | 8/2009 | Kim |
| 2009/0216937 | A1 | 8/2009 | Yasufuku |
| 2010/0157641 | A1 | 6/2010 | Shalvi et al. |
| 2011/0040927 | A1 | 2/2011 | Fuxa et al. |
| 2011/0087855 | A1 | 4/2011 | Frost et al. |
| 2012/0131180 | A1 | 5/2012 | Nomura et al. |
| 2012/0155160 | A1 | 6/2012 | Alam et al. |
| 2012/0159050 | A1 | 6/2012 | Yano et al. |
| 2012/0224441 | A1 | 9/2012 | Ko et al. |
| 2013/0111147 | A1* | 5/2013 | Mogul ................ G06F 12/0802 711/137 |
| 2013/0170313 | A1 | 7/2013 | Earle et al. |
| 2013/0201770 | A1 | 8/2013 | Harris et al. |
| 2013/0234727 | A1 | 9/2013 | Baker |
| 2014/0219007 | A1 | 8/2014 | Daily |
| 2014/0281327 | A1 | 9/2014 | Dong et al. |
| 2015/0070972 | A1 | 3/2015 | Kitagawa et al. |
| 2016/0321182 | A1 | 11/2016 | Grubisic et al. |
| 2017/0017434 | A1 | 1/2017 | Bang et al. |
| 2017/0109232 | A1 | 4/2017 | Cha et al. |
| 2017/0263295 | A1 | 9/2017 | Xiao et al. |
| 2018/0033467 | A1 | 2/2018 | Villa |
| 2018/0081580 | A1* | 3/2018 | Goel ..................... G06F 3/0613 |
| 2018/0188988 | A1 | 7/2018 | Jain et al. |
| 2018/0307620 | A1* | 10/2018 | Zhou .................. G06F 12/0246 |
| 2019/0004796 | A1 | 1/2019 | Pelster et al. |
| 2019/0065105 | A1* | 2/2019 | Gans ........................ G11C 7/12 |

FOREIGN PATENT DOCUMENTS

| | | |
|---|---|---|
| JP | 2001184257 A | 7/2001 |
| JP | 2004171753 A | 6/2004 |
| JP | 2008541334 A | 11/2008 |
| JP | 2009134828 A | 6/2009 |
| JP | 2014059876 A | 4/2014 |
| JP | 2014160489 A | 9/2014 |
| JP | 2016095889 A | 5/2016 |
| KR | 20120100435 A | 9/2012 |
| TW | 201109924 A | 3/2011 |
| TW | 201437817 A | 10/2014 |

OTHER PUBLICATIONS

ISA/KR, International Search Report and Written Opinion of the International Searching Authority, Int'l Appl. PCT/US2018/046462, dated Nov. 28, 2018, Korean Intellectual Property Office, Seo-gu, Daejeon, Republic of Kores, 14 pgs.

ISA/KR, International Search Report and Written Opinion of the International Searching Authority, Int'l Appl. PCT/US2018/047328, dated Dec. 17, 2018, Korean Intellectual Property Office, Seo-gu, Daejeon, Republic of Korea, 18 pgs.

Taiwan Intellectual Property Office, "Office Action," issued in connection with Application No. 107129209, dated May 27, 2019 (13 pages) English Translation.

KIPO, "Notice of Reasons for Rejection," issued in connection with Korean Patent Application No. 10-2020-7007815, dated Dec. 23, 2020 (13 pages).

Japanese Patent Office, "Notice of Rejection", Issued in connection with Japanese Patent Application No. 2020-510082, dated Feb. 9, 2021 (11 pages).

European Patent Office, "Extended Search Report," issued in connection with European Patent Application No. 18848403.4, dated Apr. 23, 2021 (8 pages).

Japan Patent Office, "Notice of Rejection Ground," issued in connection with Japanese Patent Application No. 2020-510110, dated May 11, 2021 (7 pages with translation).

* cited by examiner

ON DEMAND MEMORY PAGE SIZE

CROSS REFERENCE

The present Application for patent is a continuation of U.S. patent application Ser. No. 15/684,792 by Mills et al., entitled "On Demand Memory Page Size," filed Aug. 23, 2017, assigned to the assignee hereof, and is expressly incorporated by reference in its entirety herein.

BACKGROUND

The following relates generally to memory system and more specifically to on demand memory page size.

Memory system may include various kinds of memory devices and controllers that are coupled via one or more buses to manage information in numerous electronic devices such as computers, wireless communication devices, internet of things, cameras, digital displays, and the like. Buses may enable memory devices and controllers to exchange information according to a certain protocol. Memory devices are widely used to store information in such electronic devices. Information is stored by programming different states of a memory cell. For example, binary memory cells have two states, often denoted by a logic "1" or a logic "0." More than two states may be stored in a memory cell.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D Xpoint), and others. Memory devices may be volatile or non-volatile. Non-volatile memory cells, e.g., FeRAM cells, may maintain their stored logic state for extended periods of time even in the absence of an external power source. Volatile memory cells, e.g., DRAM cells, may lose their stored state over time unless they are periodically refreshed by an external power source. FeRAM may use similar memory device architectures as volatile memory but may have improved performance compared to other non-volatile and volatile memory devices.

Improving memory system, generally, may include increasing memory system performance such as reducing system power consumption, increasing memory system capacity, improving read/write speeds, providing non-volatility by use of persistent main memory, or reducing manufacturing costs at a certain performance point, among other metrics. Limitations on a memory array page size, or restrictions on adjusting page size, may impact performance or ability to improve the previously mentioned metrics.

BRIEF DESCRIPTION OF THE DRAWINGS

The disclosure herein refers to and includes the following figures.

DETAILED DESCRIPTION

Figure 1:
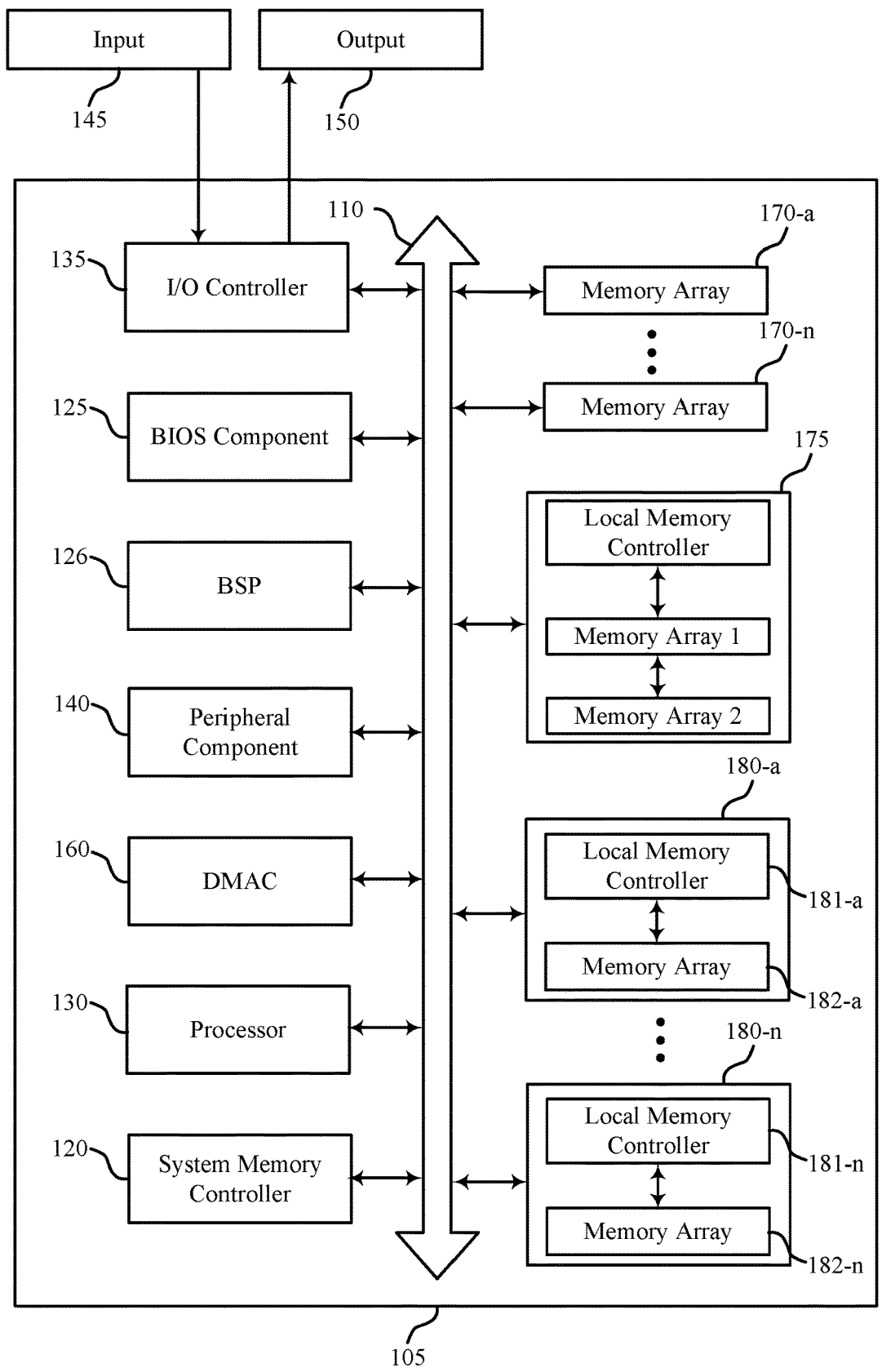
FIG. 1 shows a diagram of a system supporting on demand memory page size in accordance with embodiments of the present disclosure.

A memory system may support on demand or variable memory page size, which may improve system flexibility, power consumption, and the like. On demand or variable page sizes may be beneficial to improve performance of the memory system whereas a fixed page size, e.g., 2048 bytes, may result in unnecessary energy consumption when the memory system is required to manipulate a smaller amount of data than the fixed page size. Additionally, the variable page sizes may be beneficial to avoid unnecessary penalties in manipulating multiple pages of data if the memory system is configured to operate with a fixed, small page size. Hence, on demand memory page size may provide benefits to improve performance of the memory system.

By way of example, a memory system may include various types of memory devices communicating with a system memory controller via one or more buses according to a bus protocol. The bus protocol may be used to access various sizes of data. Size of data in the memory system may be described as a page size, e.g., 64 bytes, 512 bytes, 2048 bytes, etc. For example, the bus protocol may include a command to access a page of memory and to indicate the page size. Some types of memory, such as DRAM may have a fixed page size of 2048 bytes, for example, accessible with a Page Activate command. In some cases, a memory system utilizing DRAM may spend a certain amount of energy associated with activating the fixed page size of data during the Page Activate command when a net contents of data that the memory system produces may be smaller than 2048 bytes. Such unnecessary energy consumption may be reduced in a memory system that utilizes memory devices configured to support on demand or variable memory page size according to the net contents of data to manipulate. In addition, the bus protocol may facilitate determination of a memory page size for the memory devices to use while performing an access operation. Various parameters may be used to indicate the memory page size including a size of data, a beginning and an ending addresses for the memory devices, or an address associated with one of pre-determined memory page size options, etc.

A non-volatile memory device may be employed in a memory system and may support on demand memory page sizing. This type of memory system may provide benefits over those that employ a volatile memory array, including high system performance, high-areal density, and low system power consumption. Various types of non-volatile memory devices may be used in the memory system, such as FeRAM, flash memory, or 3D Xpoint memory. Non-volatile memory devices, unlike DRAM devices, may be configured to operate with multiple different page sizes. For example, FeRAM technology may enable a memory device configured to support multiple page sizes including 64, 128, 256, 512, 1024, or 2048 bytes. Page sizes to use in a particular operation may depend on various characteristics of memory commands and data associated with the commands. For instance, a page size may be determined to be 2048 bytes to support a legacy DRAM like operations or much smaller than 2048 bytes, e.g., 64 bytes, to effectively manipulate a small amount of data. Hence, the memory system utilizing non-volatile memory devices capable of supporting multiple different page size may implement a protocol that may allow a page size to be specified with memory commands, e.g., the Page Activate command. This may allow the memory system to request that a small page of data be opened when a small amount of data is required and a large page of data be opened when a large amount of data is requested.

For example, the present disclosure includes a system memory controller in a memory system that includes one or more memory devices capable of supporting multiple different page sizes. Each memory device may include a local memory controller that operates with different page sizes specified with memory commands, in collaboration with the system memory controller. The present disclosure includes examples using memory arrays using FeRAM technology, but any memory devices capable of supporting multiple different page sizes may be utilized, e.g., 3D Xpoint memory arrays. The memory system or sub-system disclosed herein may support various electronic apparatuses in mobile environments where power consumption may be an important design factor.

As described in detail below, the memory system may utilize various alternative options taking advantage of on demand page size capability provided by the memory devices. For example, the memory system may configure different memory locations in memory arrays to have different page sizes through configuration registers. Subsequently, the memory system may store large blocks of data that are typically sequentially accessed in the memory locations that are configured to have a large page size. In another example, the memory system may indicate a size of data without specifying a particular page size so that the local memory controller may configure an optimum page size to use to handle the data. In another example, the memory system may include a certain number of bits in combination with memory command where combination of the bits may be used as an indication of a particular page size for the local memory controller to use.

The foregoing discussion provides an overview of the disclosure. Features and techniques introduced above are further described below in the context of memory system or sub-system architecture and related protocols. Specific examples are then described for a memory system or sub-system in combination with controllers and bus protocol that support on demand memory page size. These and other features of the disclosure are further illustrated by and described with reference to apparatus diagrams, system diagrams, and flowcharts that relate to on demand memory page size.

FIG. 1 shows a diagram of a system 100 supporting on demand memory page size in accordance with embodiments of the present disclosure. System 100 may include a device 105. The device 105 may include a processor 130, a system memory controller 120, and various memory devices 170, 175, and 180. Device 105 may also include input/output controller 135, basic input/output system (BIOS) component 125, board support package (BSP) 126, peripheral component(s) 140, direct memory access controller (DMAC) 160. The components of device 105 may be in electronic communication with one another through bus 110.

Device 105 may be a computing device, electronic device, mobile computing device, or wireless device. Device 105 may be a portable electronic device. Device 105 may be a computer, a laptop computer, a tablet computer, a smartphone, a cellular phone, a wearable device, an internet-connected device, or the like. In some examples, device 105 is configured for bi-directional wireless communication via a base station or access point. In some examples, device 105 is capable of machine-type communication (MTC), machine-to-machine (M2M) communication, or device-to-device (D2D) communication. Device 105 may be referred to as a user equipment (UE), station (STA), mobile terminal, or the like.

Processor 130 may be configured to operate with various memory devices 170, 175, 180, or any combination thereof, either directly or via system memory controller 120. In some cases, processor 130 may perform functions of system memory controller 120. Processor 130 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components.

System memory controller 120 may be configured to operate with processor 130. System memory controller 120 may also be configured to operate with various memory devices 170, 175, 180, or any combination thereof.

Memory devices 170 may each include an array or arrays of memory cells to store digital information. Memory devices 170 may be configured to operate with processor 130 or system memory controller 120. In some examples, memory devices 170 may be configured to serve as a buffer memory or a memory bank for processor 130 or system memory controller 120. In some examples, one or more memory devices 170 may be present in device 105.

Memory device 175 may include a local memory controller configured to operate with an array of memory cells structured in two or more tiers. The local memory controller of memory device 175 may also be configured to operate with processor 130. The local memory controller of memory device 175 may be configured to handle different characteristics of memory cells to efficiently operate with processor 130. In some examples, first-tier memory cells may be three-dimensional cross-point memory (3D Xpoint) that may provide a high number of input/output operations per second (IOPS) with a short response time to handle various workloads. In some examples, second-tier memory cells may be three-dimensional Not-AND (NAND) memory that may provide high capacity for data storage at a relatively lower cost than the first-tier memory cells. Memory device 175 may include other types or combinations of memory arrays in some cases.

Memory devices 180 each may include a local memory controller 181 configured to operate with a memory array 182. Local memory controller 181 of memory device 180 may also be configured to operate with processor 130 or system memory controller 120. In some examples, memory array 182 may include non-volatile or volatile memory cells, or a combination of both non-volatile and volatile memory cells. In some examples, local memory controller 181 of memory device 180 may be configured to handle variable page sizes for a memory array where memory array 182 includes non-volatile memory cells, e.g., FeRAM cells. FeRAM technology may enable a memory device to support multiple page sizes including 64, 128, 256, 512, 1024, or 2048 bytes. In some examples, a page size may be fixed at a certain size for a memory array where the memory array includes volatile memory cells, e.g., legacy DRAM cells. In some examples, one or more memory devices 180 may be present in device 105.

DMAC 160 may enable processor 130 to perform direct memory accesses with memory devices 170, 175, or 180. For example, DMAC 160 may support processor to directly access a memory device 170, 175, or 180 without the involvement or operation of system memory controller 120.

Peripheral component(s) 140 may be any input or output device, or an interface for such devices, that may be integrated into device 105. Examples may include disk controllers, sound controller, graphics controller, Ethernet controller, modem, universal serial bus (USB) controller, a serial or parallel port, or peripheral card slots, such as peripheral component interconnect (PCI) or accelerated graphics port (AGP) slots. Peripheral component(s) 140 may be other components understood by those skilled in the art as peripherals.

BIOS component 125 or board support package (BSP) 126 may be a software component that includes a basic input/output system (BIOS) operated as firmware, which may initialize and run various hardware components of system 100. BIOS component 125 or BSP 126 may also manage data flow between processor 130 and the various components, e.g., peripheral components 140, input/output controller 135, etc. BIOS component 125 or BSP 126 may include a program or software stored in read-only memory (ROM), flash memory, or any other non-volatile memory.

Input/output controller 135 may manage data communication between processor 130 and peripheral component(s) 140, input devices 145, or output devices 150. Input/output controller 135 may also manage peripherals that are not integrated into device 105. In some cases, input/output controller 135 may represent a physical connection or port to the external peripheral.

Input 145 may represent a device or signal external to device 105 that provides input to device 105 or its components. This may include a user interface or interface with or between other devices. In some cases, input 145 may be a peripheral that interfaces with device 105 via peripheral component(s) 140 or may be managed by input/output controller 135.

Output 150 may represent a device or signal external to device 105 configured to receive output from device 105 or any of its components. Examples of output 150 may include a display, audio speakers, a printing device, or another processor on printed circuit board, etc. In some cases, output 150 may be a peripheral that interfaces with device 105 via peripheral component(s) 140 or may be managed by input/output controller 135.

The components of device 105 may be made up of circuitry designed to carry out their functions. This may include various circuit elements, for example, conductive lines, transistors, capacitors, inductors, resistors, amplifiers, or other active or passive elements, configured to carry out the functions described herein.

In some cases, a system may include a system memory controller and a local memory controller in electronic communication with the system memory controller, the local memory controller coupled with a memory array and configured to determine a memory page size for the memory array. In some examples, the system may include a processor in electronic communication with the system memory controller and the local memory controller and one or more components in electronic communication with the processor, where the processor is configured to access the memory array via the system memory controller and the local memory controller to operate the one or more components, where the one or more components include at least one of an input and output (I/O) controller, a peripheral component, or a basic input output system (BIOS) component.

In some cases, the processor is operable to send a memory access request that includes a first set of parameters indicative of the memory page size to the system memory controller. In some cases, the processor is operable to receive data from the local memory controller. In some cases, the processor is operable to send data to the local memory controller. In some cases, the system memory controller is operable to receive from the processor a memory access request that includes a first set of parameters indicative of the memory page size. In some cases, the system memory controller is operable to configure a memory access command based at least in part on receiving the memory access request, where the memory access command includes a second set of parameters indicative of the memory page size and an identification of the memory array, the second set of parameters based at least in part on the first set of parameters. In some cases, the system memory controller is operable to send, to the local memory controller, the memory access command with the second set of parameters.

Figure 2:
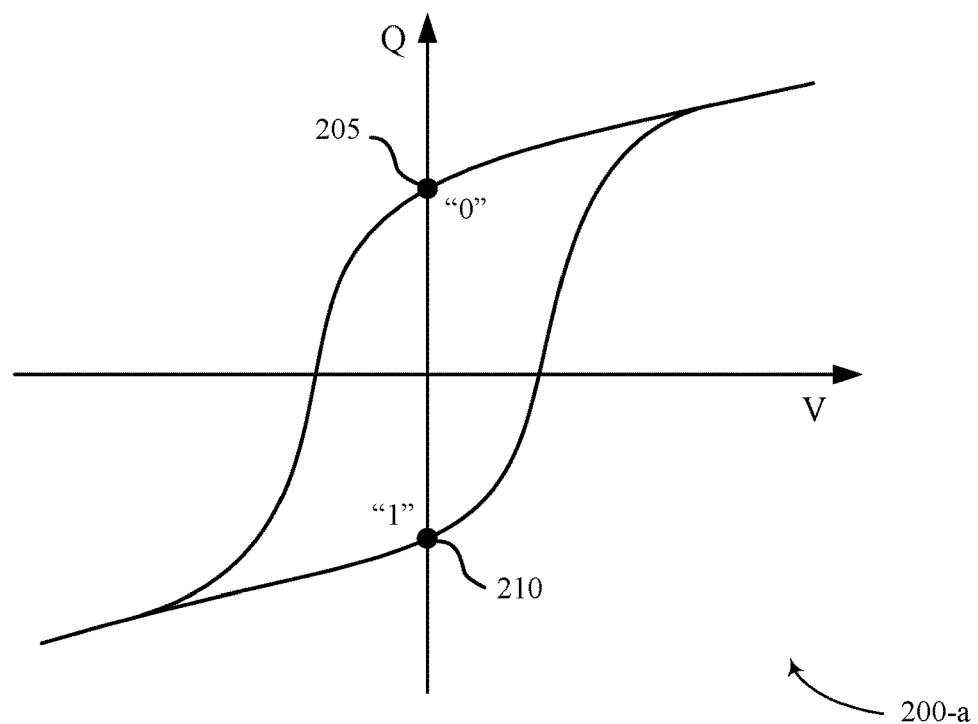
FIG. 2 illustrates an example of non-linear electrical property that support on demand memory page size in accordance with embodiments of the present disclosure.
Figure 2:
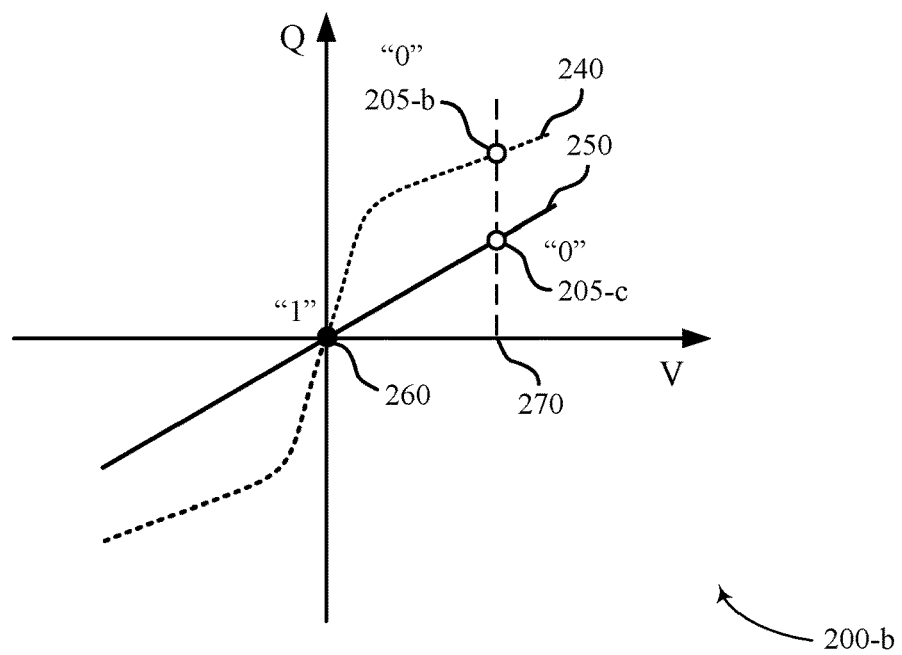

FIG. 2 illustrates an example of electrical property of a memory cell that support on demand memory page size in accordance with embodiments of the present disclosure. Plots 200 are provided to illustrate example characteristics that support features and techniques described herein. Other characteristics and material properties may support these features or similar features. Plot 200-*a* illustrates an example hysteresis curve for a capacitor using a ferroelectric material. Plot 200-*b* illustrates an example polarization of a capacitor using linear material 250 or a para-electric material 240. Plots 200 depict the charge, Q, stored on a capacitor of a memory cell utilizing ferroelectric, linear, or para-linear materials as a function of a voltage difference across the capacitor, V.

A ferroelectric material is characterized by a spontaneous electric polarization, i.e., it maintains a non-zero electric polarization in the absence of an electric field. In contrast, linear or para-electric materials exhibit polarization only in the presence of an external electric field. Because the electric polarization in a ferroelectric material may be maintained in the absence of an externally applied electric field for a relatively long time, even indefinitely, charge leakage may be significantly decreased as compared with, for example, para-electric capacitors employed in DRAM arrays. Therefore, ferroelectric memory cells may reduce or eliminate requirements to perform refresh operations when compared to DRAM cells.

As depicted in plot 200-*a*, the ferroelectric material may maintain a positive or negative charge with a zero voltage difference, resulting in two possible charged states: charge state 205 and charge state 210. According to the example of FIG. 2, charge state 205 represents a logic 0 and charge state 210 represents a logic 1. In some examples, the logic values of the respective charge states may be reversed. Charge states 205 and 210 may also be referred to as the remnant polarization (Pr) values, i.e., the remaining polarization (and thus the charge) upon removing the external bias (e.g., voltage). The ferroelectric discussed herein may be a compound that includes hafnium, zirconium, or oxygen, or any combination thereof. For example, it may include hafnium oxide or zirconia. Because the memory cells utilizing ferroelectric material maintain stored charges in the absence of external bias/voltage, ferroelectric memory cells may be termed "non-volatile memory."

Plot 200-*b* illustrates example polarization curves for a linear material 250 and a para-electric material 240. As shown, the charge, Q, of linear material 250 is linear with the applied voltage, V. Para-electric material 240 exhibits a non-linear charge with voltage. As compared with a ferro-electric material shown in plot 200-*a*, however, both linear material 250 and para-electric material 240 have a zero charge at zero voltage. Different logic states may be stored by applying a non-zero voltage to a capacitor utilizing linear material 250 or para-electric material 240. For example, charge state 205-*b* and 205-*c* corresponding to a positive voltage 270 may represent a logic 0 for para-electric material 240 and linear material 250, respectively. Negative voltages may be used as well. A charge of zero (charge state 260) may represent a logic 1 for linear material 250 and para-electric material 240. Because the linear or para-linear capacitor has a non-zero voltage across the capacitor when charged, it may be energetically favorable for electrons to leak away from the capacitor. Thus, the stored charge may leak until the charge stored in the linear or para-linear capacitor reaches to a level no longer considered as logic 0 and the stored logic state becomes corrupted or lost. Accordingly, memory cells utilizing either linear material 250 or para-electric material 240 may be termed "volatile memory."

Figure 3:
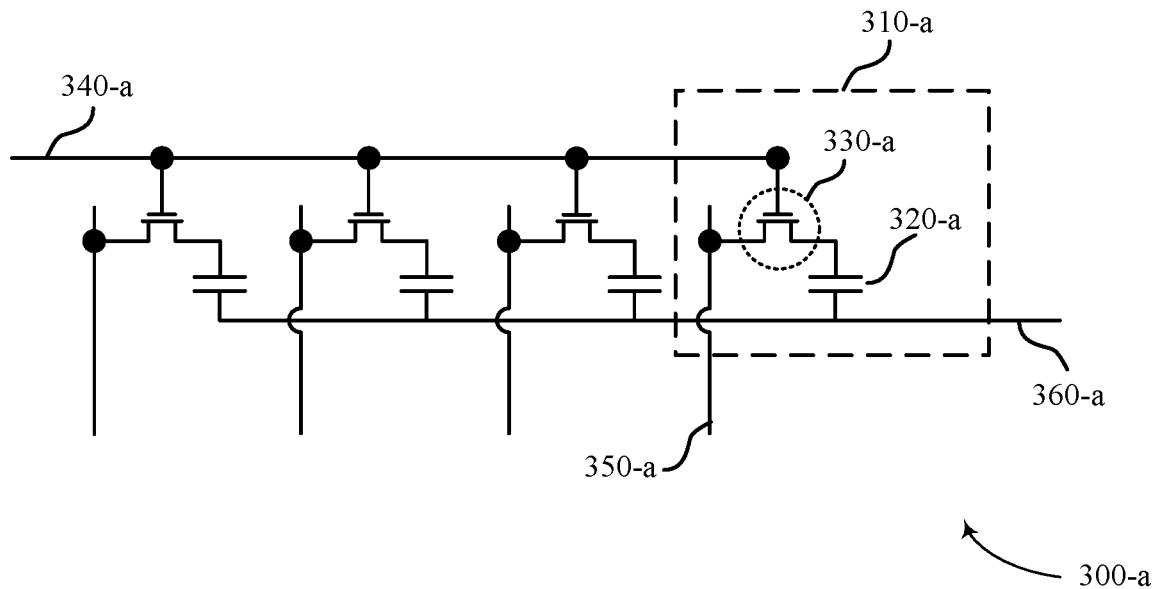
FIG. 3 illustrates an example of circuit that support on demand memory page size in accordance with embodiments of the present disclosure.
Figure 3:
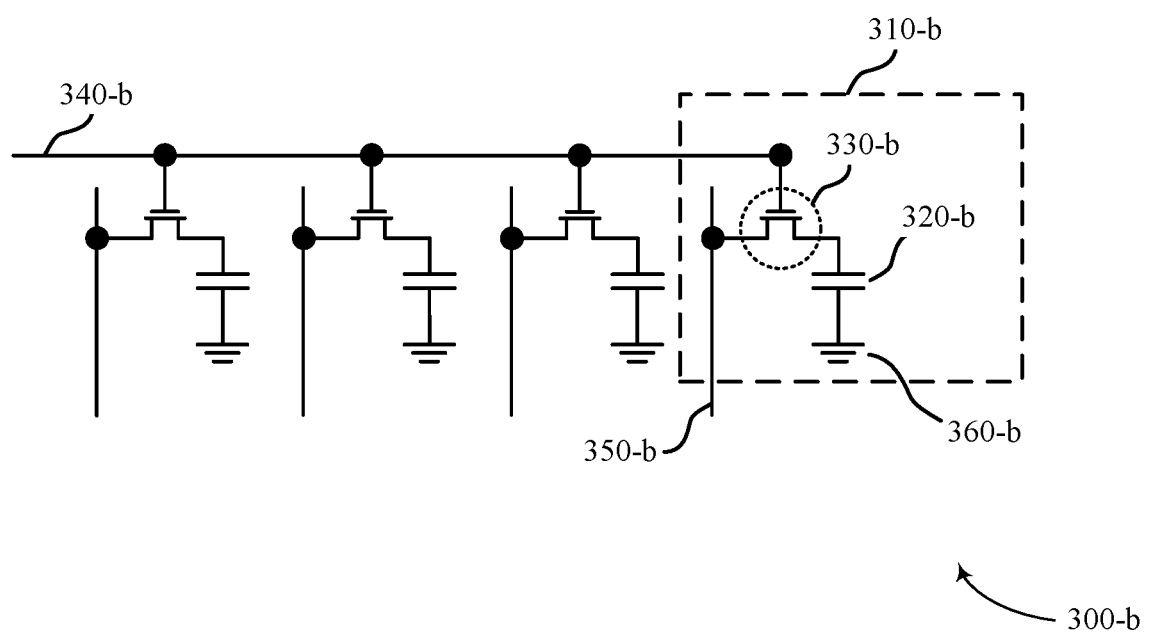

FIG. 3 illustrates an example of circuit that support on demand memory page size in accordance with embodiments of the present disclosure. Circuits 300 are provided to illustrate example characteristics that support features and techniques described herein. Other circuit configurations may support these features or similar features. Circuit 300-*a* may represent a row of ferroelectric memory array having ferroelectric memory cells that support on demand page size memory system bus protocol. Circuit 300-*b* may represent a row of volatile memory array having linear/para-linear electric memory cells of a legacy DRAM array. The circuits 300 may illustrate aspects or portions of the memory arrays described with reference to FIG. 1.

Circuit 300-*a* may include a row of ferroelectric memory cells 310-*a*, a word line 340-*a*, bit lines 350-*a*, and a plate line 360-*a*. Each ferroelectric memory cell 310-*a* may include a selection component 330-*a* and a ferroelectric capacitor 320-*a*. In some examples, selection component 330-*a* may be a field-effect transistor (FET). Memory cell 310-*a* having a ferroelectric capacitor may be referred to as a FeRAM cell. In some examples, the plate line 360-*a* may be partitioned into a number of electrically isolated plate lines (not shown) and each plate line may be selectively biased during an access operation. As an example, the plate line 360-*a* may be configured to have two electrically isolated plate lines (e.g., one plate line connected to the two left-most capacitors and the other plate line to the two right-most capacitors in circuit 300-*a*) such that a subset of memory cells sharing a common word line 340-*a* (e.g., two out of four memory cells) may be accessed. It should be appreciated by a person of ordinary skill that a two-dimensional array of ferroelectric memory cells may be arranged by repeating multiple rows of circuit 300-*a* with extended bit lines 350-*a* common to the multiple rows of memory cells.

Circuit 300-*b* may include a row of linear/para-linear memory cells 310-*b*, a word line 340-*b*, and bit lines 350-*b*. Each linear/para-linear memory cell may include a selection component 330-*b* and a linear/para-linear capacitor 320-*b*. In some examples, selection component 330-*b* may be a field-effect transistor (FET). Memory cell 310-*b* having a linear or para-linear capacitor may be referred to as a DRAM cell. A terminal of the linear/para-linear capacitor is connected to ground or virtual ground. It should be appreciated by a person of ordinary skill that a two-dimensional array of linear/para-linear memory cells may be arranged by repeating multiple rows of circuit 300-*b* with extended bit lines 350-*b* common to the multiple rows of memory cells.

During memory access operation a row of memory cells may be activated by activating a word line associated with the row. When a row of DRAM cells in circuit 300-*b* is activated, each selection component 330-*b* is activated connecting a terminal of DRAM capacitor 320-*b* to a digit line 350-*b* while the other terminal of DRAM capacitor 320-*b* is grounded or virtually grounded. Consequently, charges stored in DRAM capacitor 320-*b*, will "flow" and such flow or lack thereof (i.e., when there is no charge stored in DRAM capacitor 320-*b*) must be detected by each digit line 350-*b*. Therefore, each of the DRAM cells connected to a word line needs to be sensed when the word line is activated. DRAM page size may be determined based at least in part on this nature of DRAM operation. In order to avoid unreasonable overhead associated with repeating digital logic circuitry performing sensing, latching, and controlling of relatively small chunks of data, a typical DRAM page size tends to be fairly large. For example, a typical DRAM page size may be 2048 bytes.

On the contrary, when a row of FeRAM cells in circuit 300-*a* is activated, each selection component 330-*a* is activated connecting a terminal of ferroelectric capacitor 320-*a* to a digit line 350-*a* while the other terminal of ferroelectric capacitor 320-*a* is connected to plate line 360-*a*. Plate line 360-*a* in conjunction with the nature of ferroelectric material between the plates of capacitor 320-*a* may prevent capacitor 320-*a* from discharging upon connection to digit line 350-*a*. Operation of FeRAM cell 310-*a* by varying the voltage to plate line 360-*a* may be referred to as "moving cell plate." In some examples, the plate line 360-*a* may be partitioned into a number of electrically isolated plate lines (not shown) and each plate line may be selectively biased during an access operation. By operating a different number of plate lines 360-*a* simultaneously, a different number of memory cells, e.g., a different page size, may be accessed during memory access operation. Therefore, a subset of the FeRAM cells connected to a word line 340-*a* may be sensed at a time without having to sense all the FeRAM cells connected to the word line 340-*a*. Such nature of FeRAM cell operation may be utilized to provide a smaller page size for FeRAM than a typical DRAM page size. For example, a typical FeRAM page size may be 64 bytes. Smaller page size may allow efficient operation of FeRAM cells that usually requires higher power than operation of DRAM cells. Smaller page size may facilitate effective energy usage during operation of FeRAM device because only a small portion of FeRAM array may need to be activated when associated change in information is small. Furthermore, page size for array of FeRAM cells may be varied depending on nature of data and command utilizing FeRAM operation.

In some memory device architectures, including DRAM, memory cells may lose their stored state over time unless they are periodically refreshed by an external power source. For example, a charged capacitor with linear/para-linear materials may become discharged over time through leakage currents, resulting in the loss of the stored information. The refresh rate of these volatile memory devices may be relatively high, e.g., tens of refresh operations per second for DRAM arrays, which may result in significant system power consumption. With increasingly larger memory arrays, increased power consumption may inhibit the deployment or operation of memory arrays (e.g., power supplies, heat generation, material limits, etc.) within a memory system or sub-system, especially for mobile devices that rely on a finite power source, such as a battery.

As discussed above, ferroelectric memory devices may provide benefit due to their energy efficient variable page size operations and non-volatile nature of the ferroelectric capacitors such as near-zero standby power due to the lack of refresh operation, which may increase the battery life and allow for features such as instant-on operation following a standby or un-powered (e.g., "off") state or higher areal memory density with low system power consumption. Such features of non-volatile memory system or sub-system may, for example, support various electronic apparatuses in mobile environments where power consumption may be an important design factor.

Figure 4:
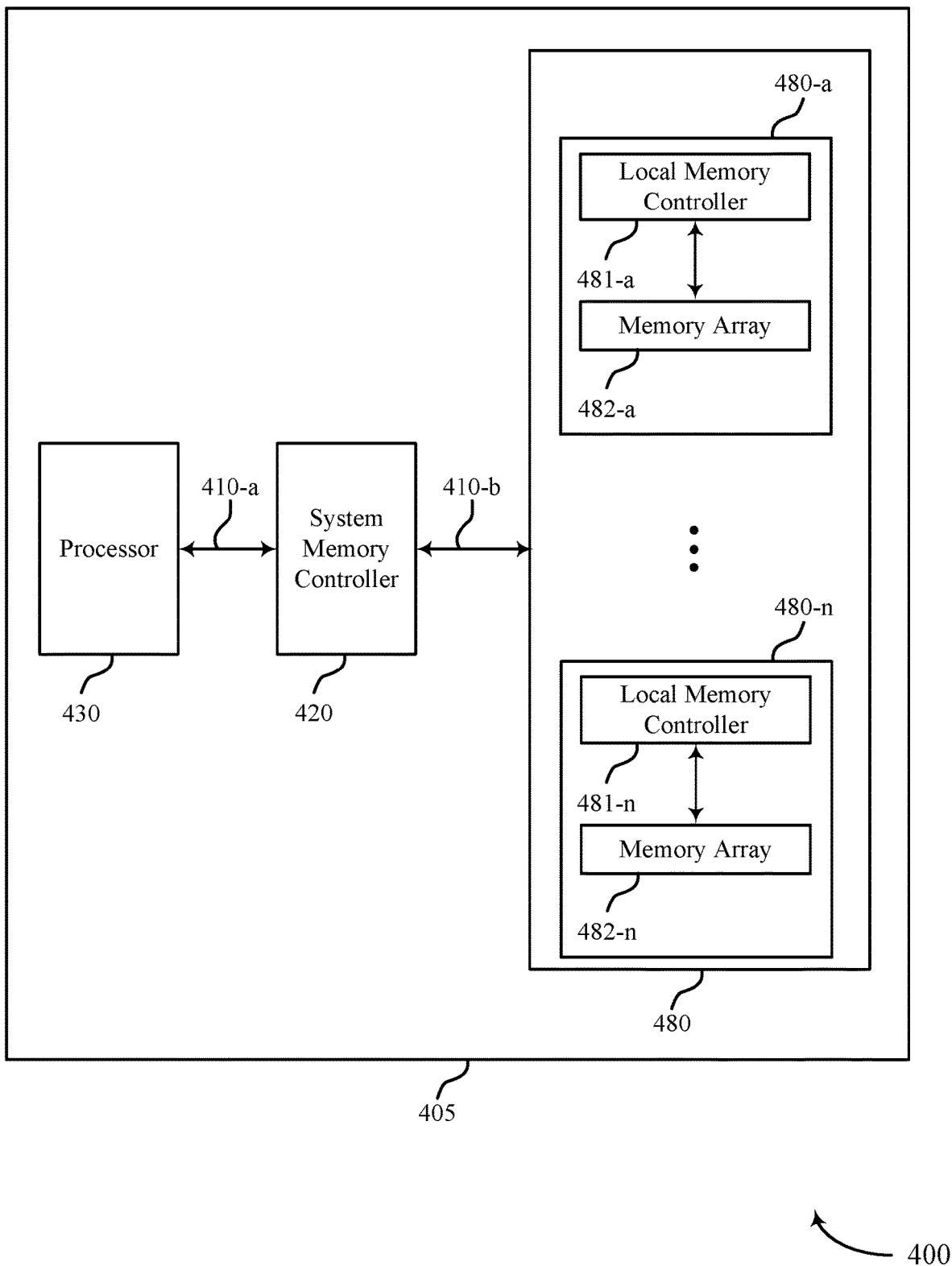
FIG. 4 illustrates an exemplary system that supports on demand memory page size in accordance with embodiments of the present disclosure.

FIG. 4 illustrates an exemplary system 400 that supports on demand memory page size in accordance with embodiments of the present disclosure. System 400 may be an example of system 100 as described with reference to FIG. 1 and may include a device 405. Device 405 may be an example of device 105 as described with reference to FIG. 1. Device 405 may include processor 430, system memory controller 420, and memory devices 480. Processor 430 may be configured to operate with system memory controller 420 via bus 410-a. System memory controller 420 may be configured to operate with processor 430 and memory devices 480 via buses 410. Processor 430 may be an example of processor 130 as described with reference to FIG. 1. System memory controller 420 may be an example of system memory controller 120 as described with reference to FIG. 1. Memory devices 480 may be an example of memory devices 180 as described with reference to FIG. 1. Bus 410 may be an example of bus 110 as described with reference to FIG. 1.

In some examples, memory device 480 may include a local memory controller 481 and memory array 482. Local memory controller 481 may be an example of local memory controller 181 as described with reference to FIG. 1. Memory array 482 may be an example of memory array 182 as described with reference to FIG. 1. In some examples, memory array 482 may include FeRAM cells or other kinds of non-volatile memory cells employing different non-volatile memory technologies than FeRAM. As discussed above, FeRAM arrays may provide benefits over DRAM arrays due to energy efficient variable page size operations and non-volatile nature of ferroelectric capacitors, especially in mobile system where battery power consumption may be one of primary factors to consider. In some examples, local memory controller 481 may be configured to handle variable page sizes pertinent to characteristics of memory commands and data involved in the memory commands. Local memory controller 481 may be configured to operate with memory array 482. In addition, local memory controller 481 may be configured to operate with system memory controller 420 via bus 410-b.

In some cases, a system may include a processor, a local memory controller associated with a memory array, and a system memory controller in electronic communication with the processor and the local memory controller, where the system memory controller is operable to receive, from the processor, a memory access request including a first set of parameters indicative of a memory page size, configure a memory access command based at least in part on receiving the memory access request, where the memory access command includes a second set of parameters indicative of the memory page size and an identification of the memory array, the second set of parameters based at least in part on the first set of parameters, and send, to the local memory controller, the memory access command with the second set of parameters, where the local memory controller is configured to determine the memory page size based at least in part on the second set of parameters.

In some cases, the first set of parameters includes an indication of data for an access operation and a size of the data, and the second set of parameters includes the identification of the memory array, an address associated with the memory array, and the size of the data. In some cases, the first set of parameters includes a beginning address and an ending address for the memory array, and the second set of parameters includes the identification of the memory array, the beginning address, and the ending address associated with the memory array. In some cases, the first set of parameters includes an address indicating a location of data to access and a number of bits determinative of the memory page size, and the second set of parameters includes the identification of the memory array, the address associated with the memory array, and the memory page size for the local memory controller. In some cases, the first set of parameters includes an indicator of a relationship between contents of the bits and the memory page size. In some cases, the first set of parameters includes an address associated with a pre-determined memory page size, and the second set of parameters includes the identification of the memory array, the address associated with the memory array, and the pre-determined memory page size for the local memory controller. In some cases, the pre-determined memory page size is selected from a plurality of memory page sizes based at least in part on the address, and the first set of parameters comprises an indication of a relationship between the address and the pre-determined memory page size.

In some cases, a system may include a system memory controller, a local memory controller associated with a memory array, and a processor in electronic communication with the system memory controller and the local memory controller, where the processor is operable to send a memory access request that includes a first set of parameters indicative of a memory page size, to the system memory controller that is coupled to the local memory controller configured to determine the memory page size for the memory array, and perform one or more operations according to the memory access request. In some cases, the memory access request includes one or more read instructions and the one or more operations include receiving data from the local memory controller. In some cases, the memory access request includes one or more write instructions and the one or more operations include sending data to the local memory controller.

Figure 5:
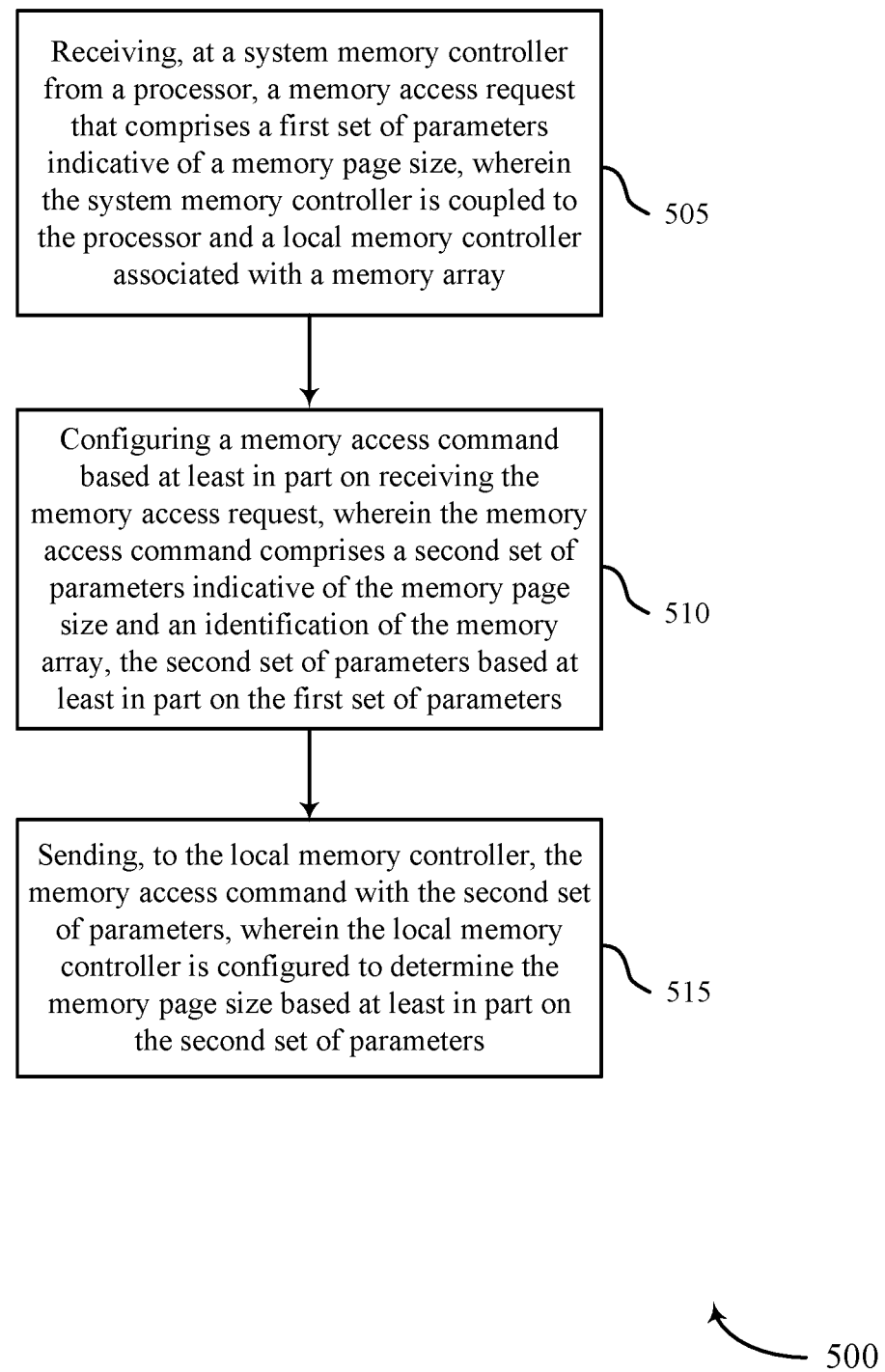
FIG. 5 shows a flowchart illustrating a method for operating on demand memory page size in accordance with embodiments of the present disclosure.

FIG. 5 shows a flowchart illustrating a method 500 for operating on demand memory page size in accordance with embodiments of the present disclosure. The operation of method 500 may be implemented by system memory controller 120 as described with reference to FIG. 1 or system memory controller 420 as described with reference to FIG. 4, as described herein.

At block 505, system memory controller 420 may receive, from the processor, a memory access request including a first set of parameters indicative of a memory page size. The operations of block 505 may be performed according to the methods described with reference to FIGS. 1 through 4.

At block 510, system memory controller 420 may configure a memory access command based at least in part on receiving the memory access request, where the memory access command includes a second set of parameters indicative of the memory page size and an identification of the memory array, the second set of parameters based at least in part on the first set of parameters. The operations of block 510 may be performed according to the methods described with reference to FIGS. 1 through 4.

At block 515, system memory controller 420 may send, to the local memory controller, the memory access command with the second set of parameters, where the local memory controller is configured to determine the memory page size based at least in part on the second set of parameters. The operations of block 515 may be performed according to the methods described with reference to FIGS. 1 through 4.

In some embodiments, a method for on demand memory page size is disclosed. The method may include receiving, at a system memory controller from a processor, a memory access request that includes a first set of parameters indicative of a memory page size, where the system memory controller is coupled to the processor and a local memory controller associated with a memory array, configuring a memory access command based at least in part on receiving the memory access request, where the memory access command includes a second set of parameters indicative of the memory page size and an identification of the memory array, the second set of parameters based at least in part on the first set of parameters, and sending, to the local memory controller, the memory access command with the second set of parameters, where the local memory controller is configured to determine the memory page size based at least in part on the second set of parameters.

In some cases, the first set of parameters includes an indication of data for an access operation and a size of the data, and the second set of parameters includes the identification of the memory array, an address associated with the memory array, and the size of the data. In some cases, the first set of parameters includes a beginning address and an ending address for the memory array, and the second set of parameters includes the identification of the memory array, the beginning address, and the ending address associated with the memory array. In some cases, the first set of parameters includes an address indicating a location of data to access and a number of bits determinative of the memory page size, and the second set of parameters includes the identification of the memory array, the address associated with the memory array, and the memory page size for the local memory controller. In some cases, the first set of parameters includes an indicator of a relationship between contents of the bits and the memory page size. In some cases, the first set of parameters includes an address associated with a pre-determined memory page size, and the second set of parameters includes the identification of the memory array, the address associated with the memory array, and the pre-determined memory page size for the local memory controller. In some cases, the pre-determined memory page size is selected from a plurality of memory page sizes based at least in part on the address, and the first set of parameters includes an indication of a relationship between the address and the pre-determined memory page size.

Figure 6:
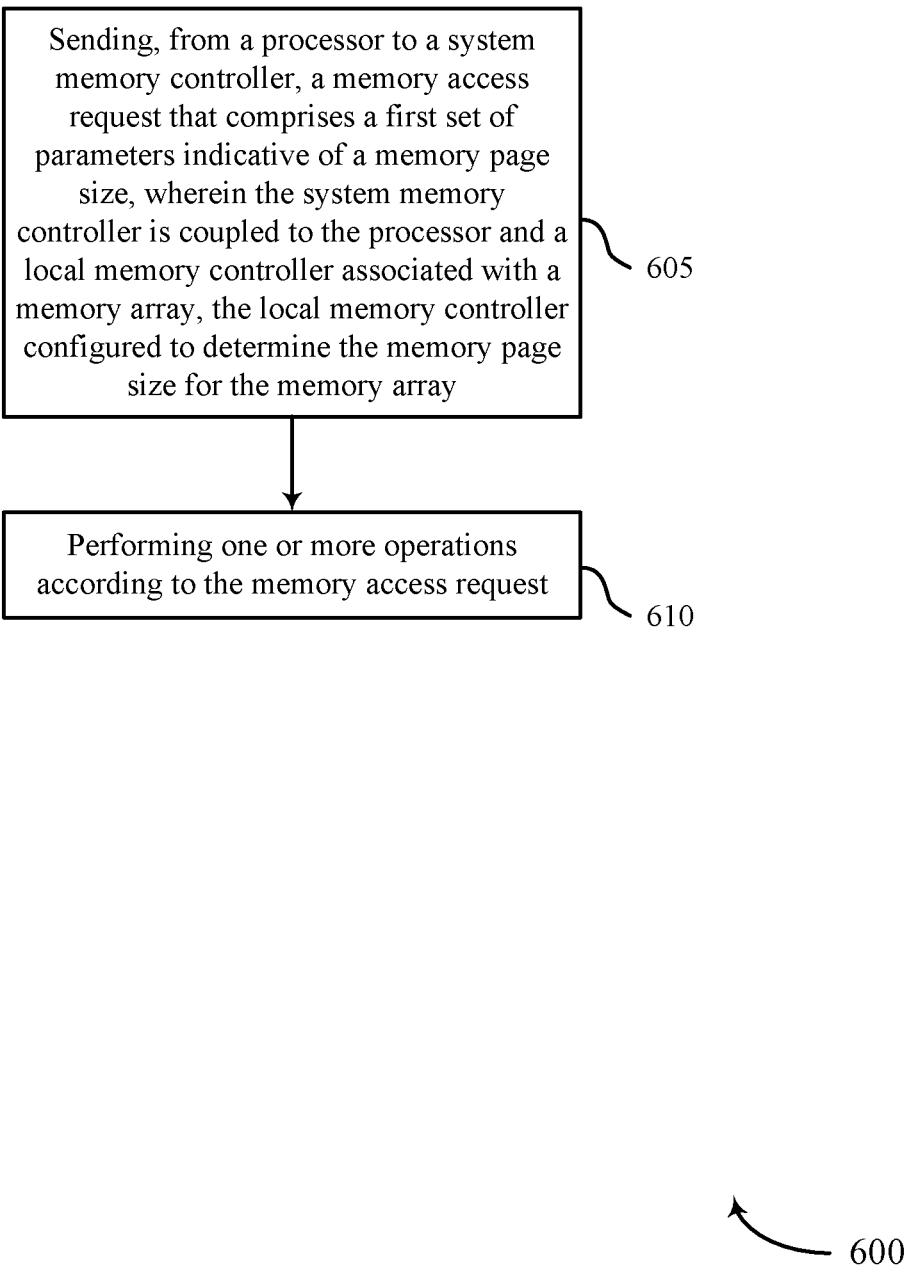
FIG. 6 shows a flowchart illustrating a method for operating on demand memory page size in accordance with embodiments of the present disclosure.

FIG. 6 shows a flowchart illustrating a method 600 for operating on demand memory page size in accordance with embodiments of the present disclosure. The operation of method 600 may be implemented by processor 130 as described with reference to FIG. 1 or processor 430 as described with reference to FIG. 4, as described herein.

At block 605, processor 430 may send to a system memory controller, a memory access request that includes a first set of parameters indicative of a memory page size, where the system memory controller is coupled to the processor and a local memory controller associated with a memory array, the local memory controller configured to determine the memory page size for the memory array. The operations of block 605 may be performed according to the methods described with reference to FIGS. 1 through 4.

At block 610, processor 430 may perform one or more operations according to the memory access request. The operations of block 610 may be performed according to the methods described with reference to FIGS. 1 through 4.

In some embodiments, a method for on demand memory page size is disclosed. The method may include sending, from a processor to a system memory controller, a memory access request that includes a first set of parameters indicative of a memory page size, where the system memory controller is coupled to the processor and a local memory controller associated with a memory array, the local memory controller configured to determine the memory page size for the memory array, and performing one or more operations according to the memory access request. In some cases, the memory access request includes one or more read instructions, and the one or more operations includes receiving data from the local memory controller. In some cases, the memory access request includes one or more write instructions, and the one or more operations include sending data to the local memory controller.

It should be noted that the methods described above describe possible implementations, and that the operations and the steps may be rearranged or otherwise modified and that other implementations are possible. Furthermore, features from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly connected with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The term "electronic communication" and "coupled" refer to a relationship between components that support electron flow between the components. This may include a direct connection between components or may include intermediate components. Components in electronic communication or coupled to one another may be actively exchanging electrons or signals (e.g., in an energized circuit) or may not be actively exchanging electrons or signals (e.g., in a de-energized circuit) but may be configured and operable to exchange electrons or signals upon a circuit being energized. By way of example, two components physically connected via a switch (e.g., a transistor) are in electronic communication or may be coupled regardless of the state of the switch (i.e., open or closed).

A transistor or transistors discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
sending, from a processor to a system memory controller, a memory access request comprising a set of parameters including a first parameter indicating a quantity of bits associated with a variable memory page size of a memory array, wherein the system memory controller is coupled to the processor and a local memory controller associated with the memory array, the local memory controller configured to determine the variable memory page size for the memory array based at least in part on the set of parameters; and
performing one or more operations according to the memory access request indicating the variable memory page size.

2. The method of claim 1, wherein:
the memory access request comprises one or more read instructions, and
the one or more operations comprise receiving data from the local memory controller.

3. The method of claim 1, wherein:
the memory access request comprises one or more write instructions, and
the one or more operations comprise sending data to the local memory controller.

4. The method of claim 1, wherein:
the set of parameters includes a second parameter indicating an address associated with a location of data to access.

5. The method of claim 1, wherein:
the system memory controller is configured to send a second set of parameters to the local memory controller based at least in part on the set of parameters, and
the second set of parameters comprises an identification of the memory array, an address associated with the memory array, and the variable memory page size.

6. A system, comprising:
a system memory controller;
a local memory controller in electronic communication with the system memory controller, the local memory controller coupled with a memory array and operable to determine a variable memory page size for the memory array;
a processor in electronic communication with the system memory controller and the local memory controller, the processor operable to send a set of parameters including a first parameter indicating a quantity of bits associated with the variable memory page size for the memory array to the system memory controller, wherein the local memory controller is operable to determine the variable memory page size for the memory array based at least in part on the set of parameters; and
one or more components in electronic communication with the processor, wherein the processor is operable to access the memory array via the system memory controller and the local memory controller according to the variable memory page size to operate the one or more components, wherein the one or more components comprise at least one of:
an input and output (I/O) controller;
a peripheral component; or
a basic input/output system (BIOS) component.

7. The system of claim 6, wherein:
the processor is operable to send a memory access request that comprises the set of parameters indicative of the variable memory page size to the system memory controller.

8. The system of claim 6, wherein:
the processor is operable to receive data from the local memory controller.

9. The system of claim 6, wherein:
the processor is operable to send data to the local memory controller.

10. The system of claim 6, wherein:
the system memory controller is operable to receive, from the processor, a memory access request that comprises the set of parameters indicative of the variable memory page size.

11. The system of claim 10, wherein:
the system memory controller is operable to configure a memory access command based at least in part on receiving the memory access request,
the memory access command comprises a second set of parameters indicative of the variable memory page size and an identification of the memory array, and
the second set of parameters is based at least in part on the set of parameters.

12. The system of claim 11, wherein:
the second set of parameters comprises at least one of the identification of the memory array, an address associated with the memory array, or the variable memory page size.

13. The system of claim 11, wherein:
the system memory controller is further operable to send, to the local memory controller, the memory access command with the second set of parameters.

14. The system of claim 11, wherein:
the processor is operable to perform one or more operations according to the memory access request indicating the variable memory page size.

15. The system of claim 6, wherein:
the set of parameters includes a second parameter indicating an address associated with a location of data to access.

16. A system, comprising:
a local memory controller associated with a memory array and configured to determine a variable memory page size for the memory array;
a system memory controller coupled with the local memory controller; and
a processor in electronic communication with the system memory controller and the local memory controller, wherein the processor is configured to:
send, to the system memory controller, a memory access request comprising a set of parameters including a first parameter indicating a quantity of bits associated with the variable memory page size for the memory array, wherein the local memory controller is configured to determine the variable memory page size for the memory array based at least in part on the set of parameters; and
perform one or more operations according to the memory access request indicating the variable memory page size.

17. The system of claim 16, wherein:
the memory access request comprises one or more read instructions, and
the one or more operations comprise receiving data from the local memory controller.

18. The system of claim 16, wherein:
the memory access request comprises one or more write instructions, and
the one or more operations comprise sending data to the local memory controller.

19. The system of claim 16, wherein:
the set of parameters includes a second parameter indicating an address associated with a location of data to access.

20. The system of claim 16, wherein:
the system memory controller is configured to send a second set of parameters to the local memory controller based at least in part on the set of parameters, and
the second set of parameters comprises an identification of the memory array, an address associated with the memory array, and the variable memory page size.

* * * * *